United States Patent
Tsai

(10) Patent No.: US 7,066,676 B2
(45) Date of Patent: Jun. 27, 2006

(54) LOCATING DEVICE FOR A RETRACTABLE STRUT OF A TENT OR A CLOSET

(76) Inventor: Ming-Liang Tsai, 4F-3, No. 8, Fu Ching St., Taipei (TW)

( * ) Notice: Subject to any disclaimer, the term of this patent is extended or adjusted under 35 U.S.C. 154(b) by 133 days.

(21) Appl. No.: 10/837,658

(22) Filed: May 4, 2004

(65) Prior Publication Data

US 2005/0249545 A1    Nov. 10, 2005

(51) Int. Cl.
*F16B 7/10*       (2006.01)
*E04H 15/46*    (2006.01)

(52) U.S. Cl. .............. 403/109.3; 403/109.1; 403/109.2; 403/109.7; 403/328; 403/329; 403/379.2; 403/397; 403/DIG. 14; 135/142

(58) Field of Classification Search .. 403/109.1–109.3, 403/109.7, 109.8, 329, 379.2, 397, DIG. 14, 403/328; 135/140, 141, 142, 75, 130–131, 135/143–146, 120.3; 52/157, 63, 67, 83
See application file for complete search history.

(56) References Cited

U.S. PATENT DOCUMENTS

| | | | | |
|---|---|---|---|---|
| 3,656,494 A | * | 4/1972 | Cornett et al. | 135/142 |
| 3,669,463 A | * | 6/1972 | Boudreau | 403/109.3 |
| 4,085,763 A | * | 4/1978 | Thomas | 403/109.3 |
| 4,329,078 A | * | 5/1982 | Crates et al. | 403/329 |
| 4,466,377 A | * | 8/1984 | Kolb et al. | 403/329 |
| 6,254,305 B1 | * | 7/2001 | Taylor | 403/109.1 |
| 6,749,227 B1 | * | 6/2004 | Margid | 403/109.3 |
| 6,886,839 B1 | * | 5/2005 | Everett | 403/109.3 |

* cited by examiner

*Primary Examiner*—Daniel P. Stodola
*Assistant Examiner*—Victor MacArthur
(74) *Attorney, Agent, or Firm*—Rosenberg, Klein & Lee

(57) ABSTRACT

A locating device for a retractable strut of a tent or a closet includes an engaging device, a sliding bracket, an upper strut and a lower strut. The sliding bracket is secured onto the lower strut. The upper strut is inserted into the lower strut and has an elastic buckle therein. The sliding bracket comprises a through hole for insertion of the elastic buckle. The engaging device has a pair of extension plates at respective sides and a stud at the inner center wall. The sliding bracket comprises a pair of slots at respective sides for insertion of the extension plates of the engaging device. By pressing the engaging device, the elastic buckle is urged to retract from the through hole of the sliding bracket.

2 Claims, 8 Drawing Sheets

A-A

LOCATING DEVICE FOR A RETRACTABLE STRUT OF A TENT OR A CLOSET

FIELD OF THE INVENTION

This invention is adapted to a retractable strut of a tent or a closet and relates to a locating device that contains an engaging device inserted into a sliding bracket. The engaging device comprises a stud corresponding to an elastic buckle. By pressing the engaging device, the elastic buckle is retracted from the sliding bracket. Thus, the retractable strut of the tent or the closet is free to move.

BACKGROUND OF THE INVENTION

Tents and closets have been widely used by consumers. As shown in FIGS. 7 and 8, a conventional tent comprises an upper strut 8 inserted into a lower strut 7 in a slidable manner. The upper strut 8 includes an elastic buckle 6 having a spot 61. A sliding bracket 5 is secured onto the lower strut 7 and comprises a through hole for insertion of the spot 61 of the elastic buckle 6. When the user wants to retract the upper strut 8 from the lower strut 7, he needs to push the spot 61 inward away from the through hole 51, which is hard to operate and may hurt the user sometimes.

In view of these shortcomings, and many others, the inventor has derived the present invention.

SUMMARY OF THE INVENTION

It is the primary object to provide a locating device for a retractable strut of a tent or a closet, which is easy to operate.

It is another object to provide a locating device for a retractable strut of a tent or a closet, which is safe in operation.

It is a further object to provide a locating device for a retractable strut of a tent or a closet, which is more stable and inexpensive in manufacture.

DETAILED DESCRIPTION OF THE PREFERRED EMBODIMENT

Figure 1:
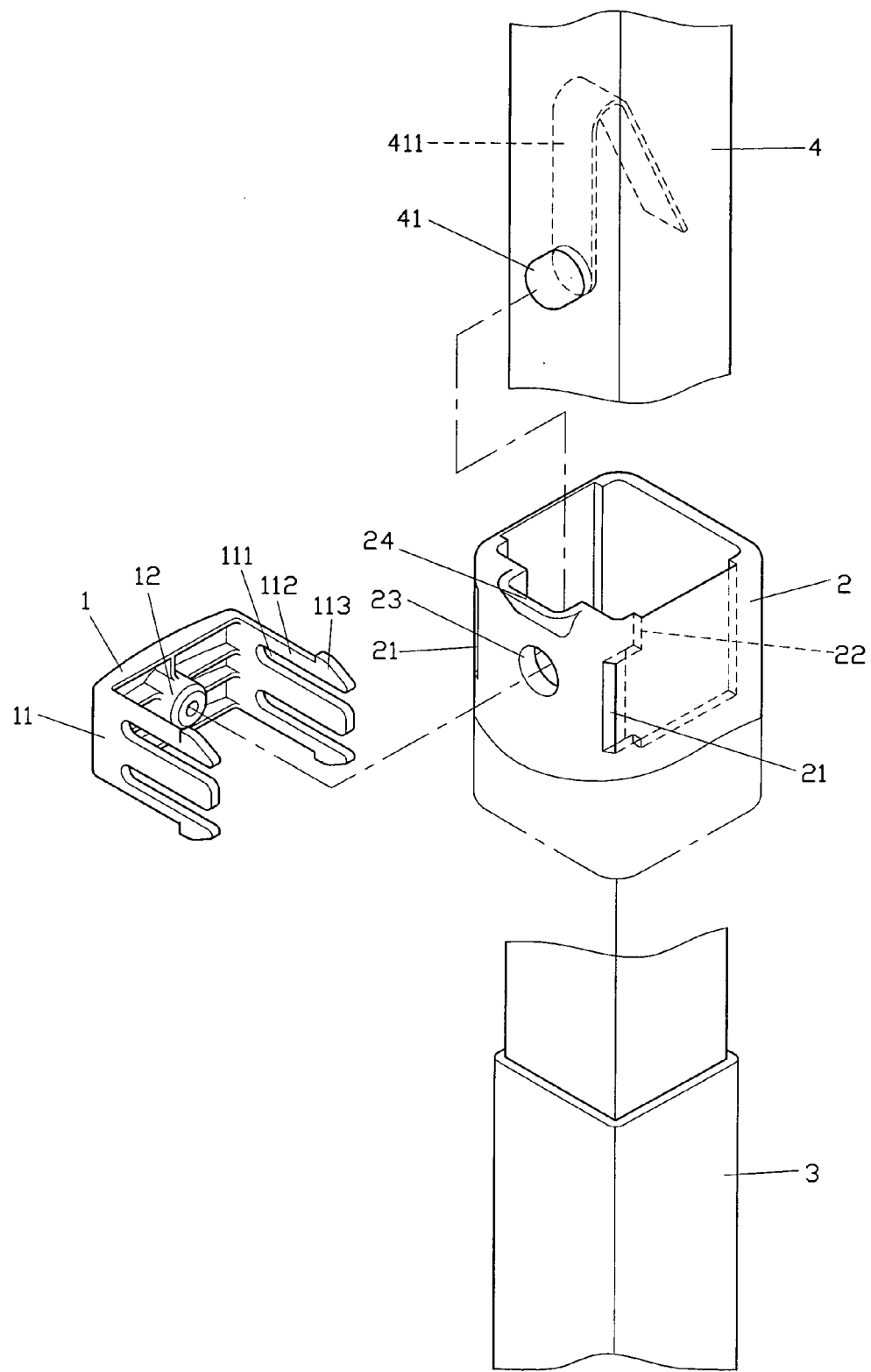
FIG. 1 is an exploded view of the present invention.

The present invention comprises an engaging device 1, a sliding bracket 2, an upper strut 3, and a lower strut 4.

The engaging device 1 has a pair of extension plates 11 protruding from respective sides thereof. Each extension plate 11 has a pair of cracks 111 at the center to divide the plate into three strips 112. The top and bottom strips 112 of each extension plate 11 are formed with hooks 113 at far ends. The engaging device 1 further comprises a stud 12 protruding from the inner center wall.

The sliding bracket 2 is secured to the top end of the lower strut 3. The sliding bracket 2 has a pair of slots 21 at respective sides. Each slot 21 has a pair of edges 22 on the inner top and bottom ends. The sliding bracket 2 further comprises a through hole 23 formed at the front center portion and a slanting surface 24 formed at the front top end thereof.

The upper strut 4 comprises an elastic buckle 41 having a reverse V-shaped elastic plate 411 and is in a constant protruding status.

Figure 2:
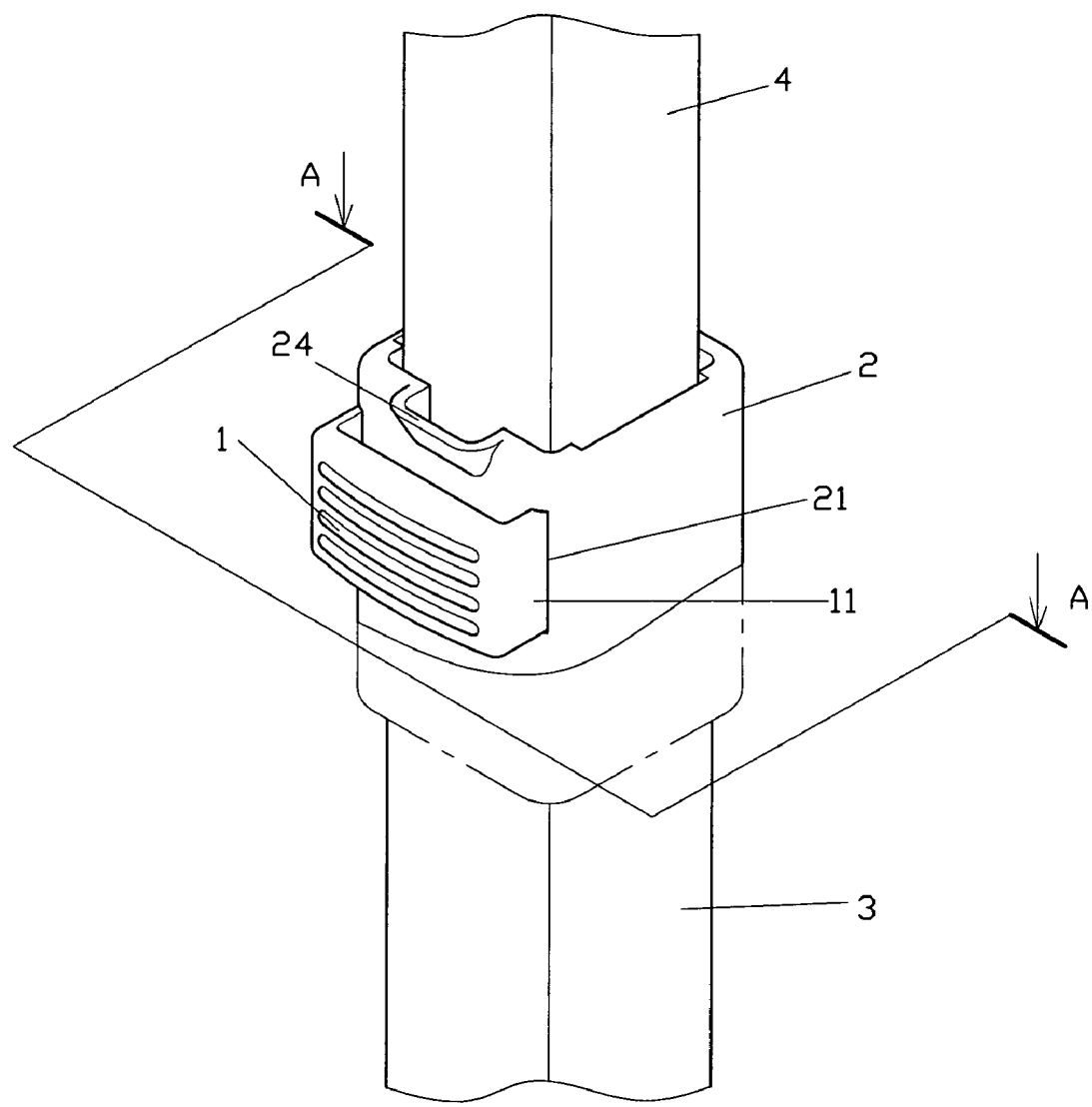
FIG. 2 is a perspective view of the present invention.
Figure 3:
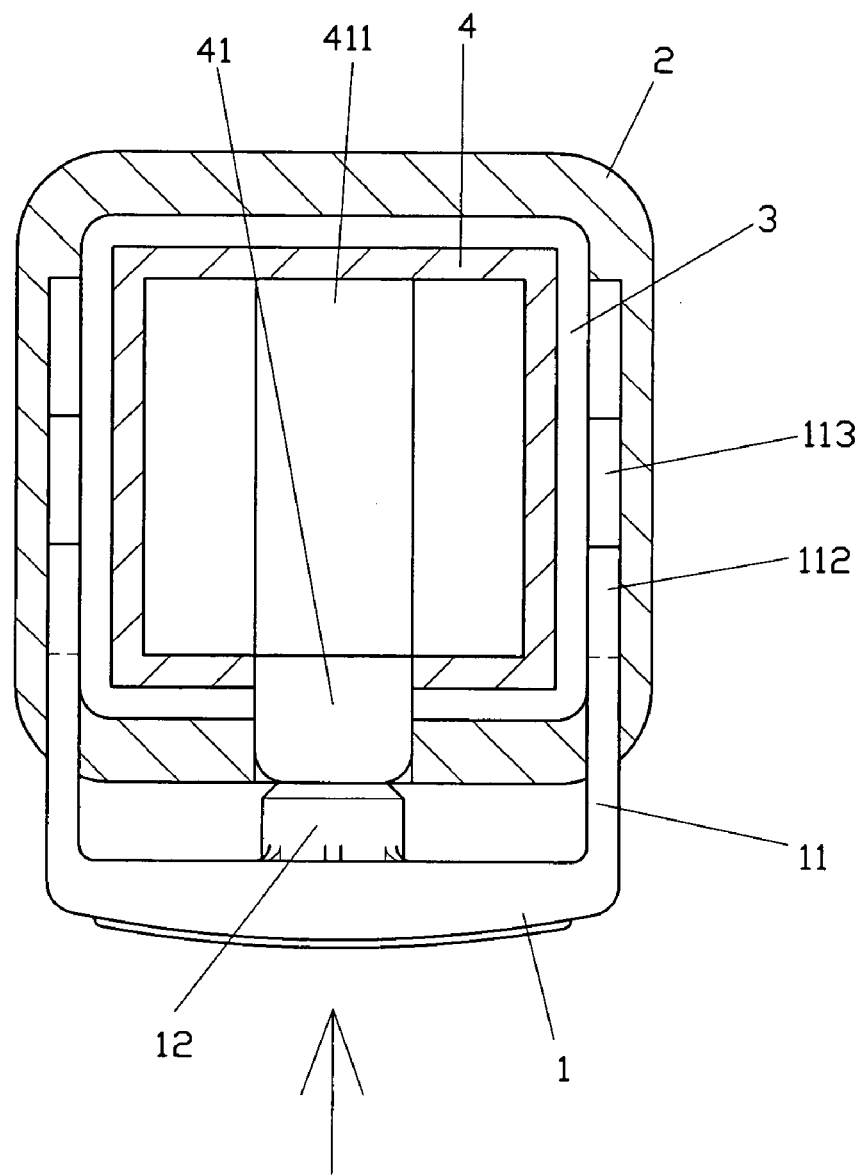
FIG. 3 is a cross-sectional view taken along line A—A of FIG. 2.

As shown in FIGS. 2 and 3, the sliding bracket 2 is secured to the top end of the lower strut 3. The upper strut 4 is inserted into the lower strut 3. The engaging device 1 is inserted into the sliding bracket 2 with the two extension plates 11 sliding through the slots 21. The slanting angles of the hooks 113 on the top and bottom strips 112 of each extension plate 11 will be urged by the slots 21 to squeeze towards the center of each extension plate 11, allowing the extension plates 11 to enter into the slots 21 of the sliding bracket 2. Upon the extension plates 11 of the engaging device 1 enter into the slots 21, the hooks 113 of the engaging device 1 will encounter with the edges 22 of the sliding bracket 2, which confines the extension plates 11 from sliding away. The slanting surface 24 of the sliding bracket 2 urges the elastic buckle 41 to buckle into the through hole 23. The elastic buckle 41 aligns with the stud 12 of the engaging device 1.

Figure 4:
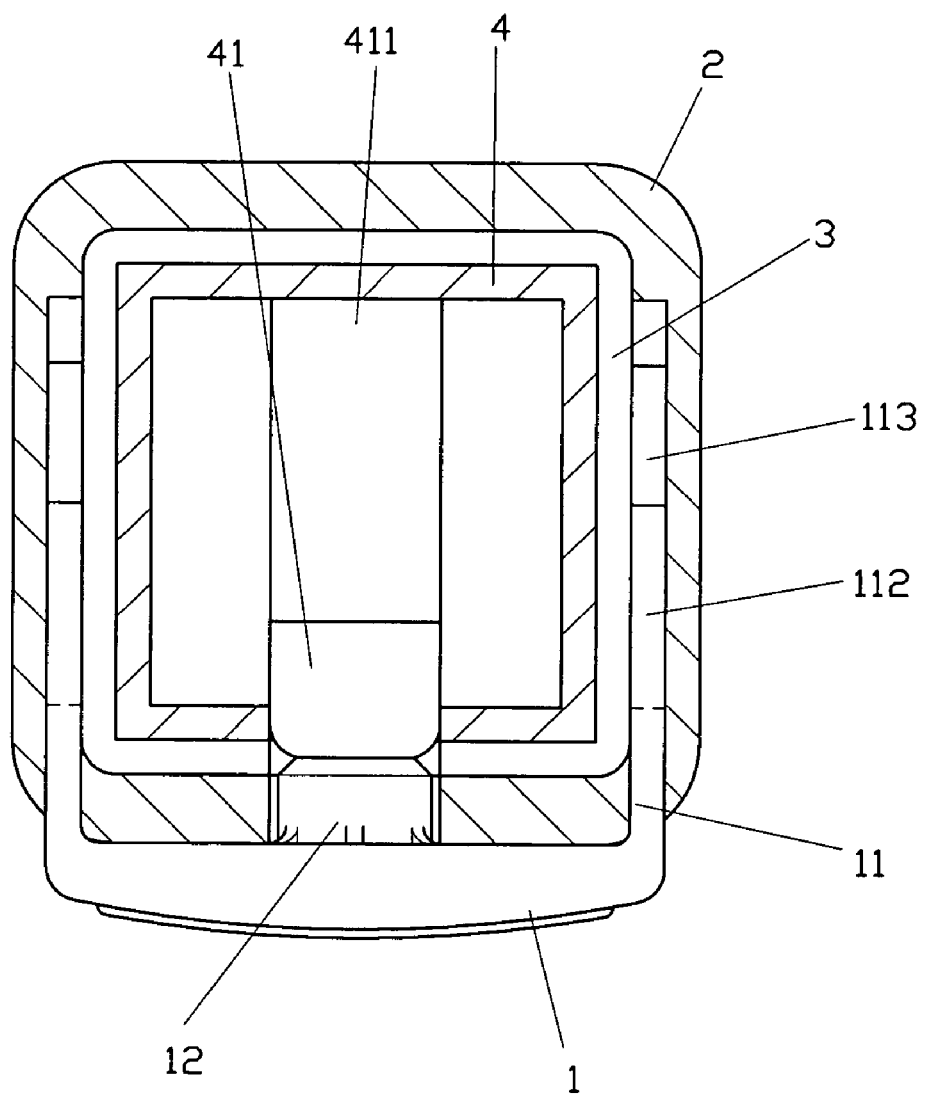
FIG. 4 is a view similar to FIG. 3, in an active status.

To operate the present invention, as shown in FIG. 4, when the engaging device 1 is pressed, the stud 12 of the engaging device 1 is pushed to retract the elastic buckle 41 from the through hole 23. Thus, the upper strut 4 is free to move.

Figure 5:
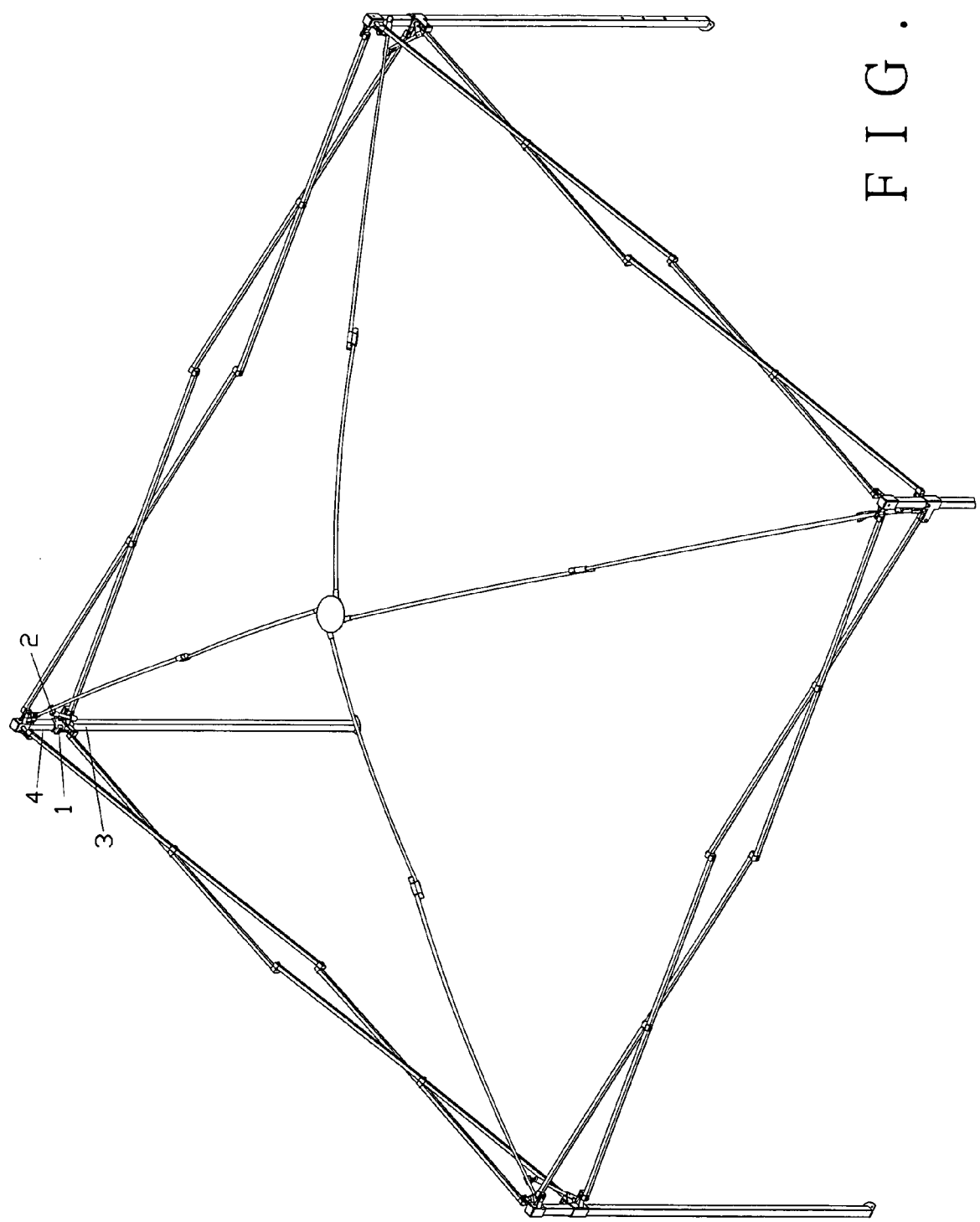
FIG. 5 is a perspective view of a tent frame incorporated with the present invention.

FIG. 5 shows a tent frame incorporated with the present invention. By pressing the engaging device 1 secured onto the sliding bracket 2, the upper strut 4 is able to slide along the lower strut 3 so as to collapse or to expand the tent frame.

Figure 6:
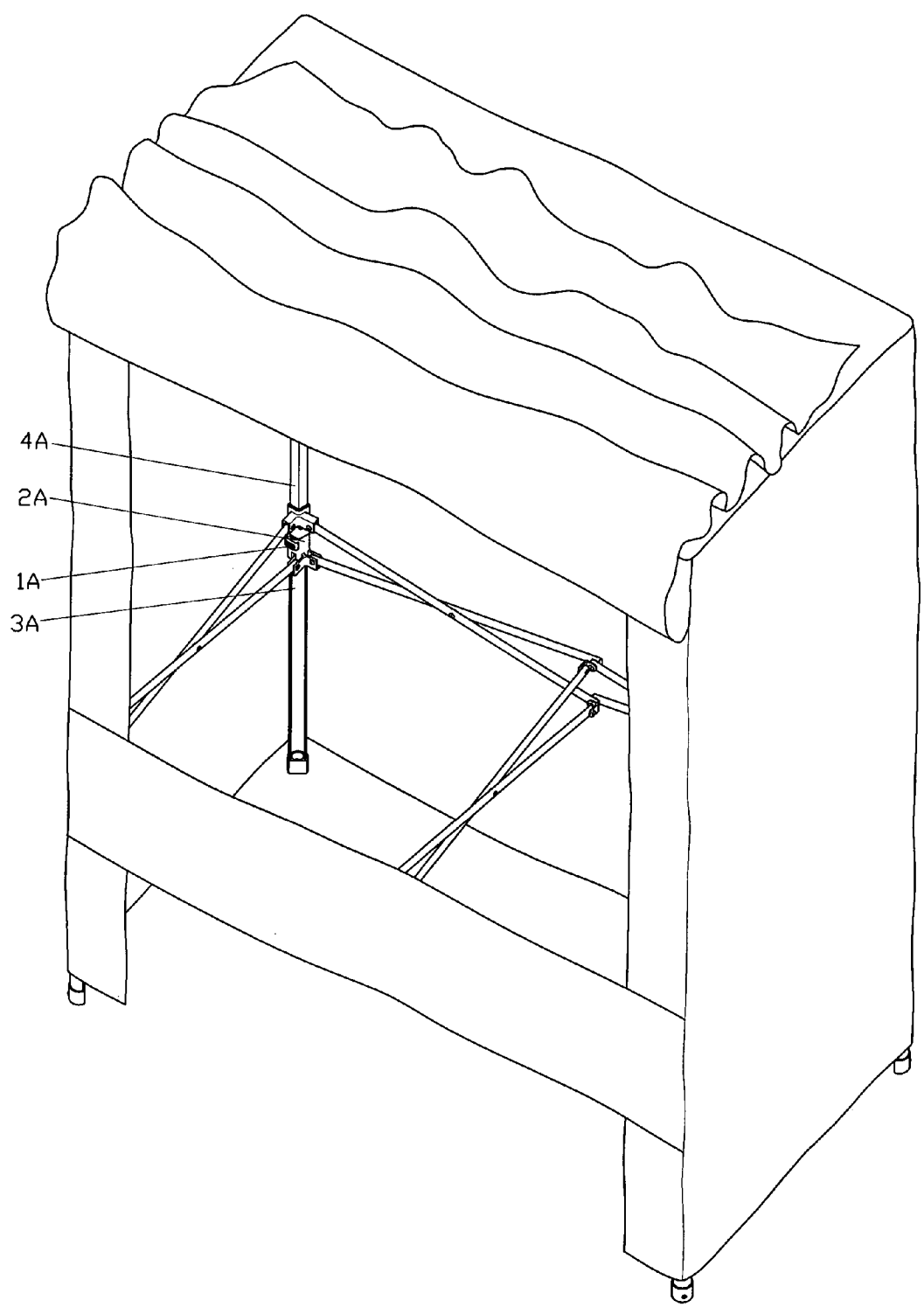
FIG. 6 is a perspective view of a closet incorporated with the present invention.
Figure 7:
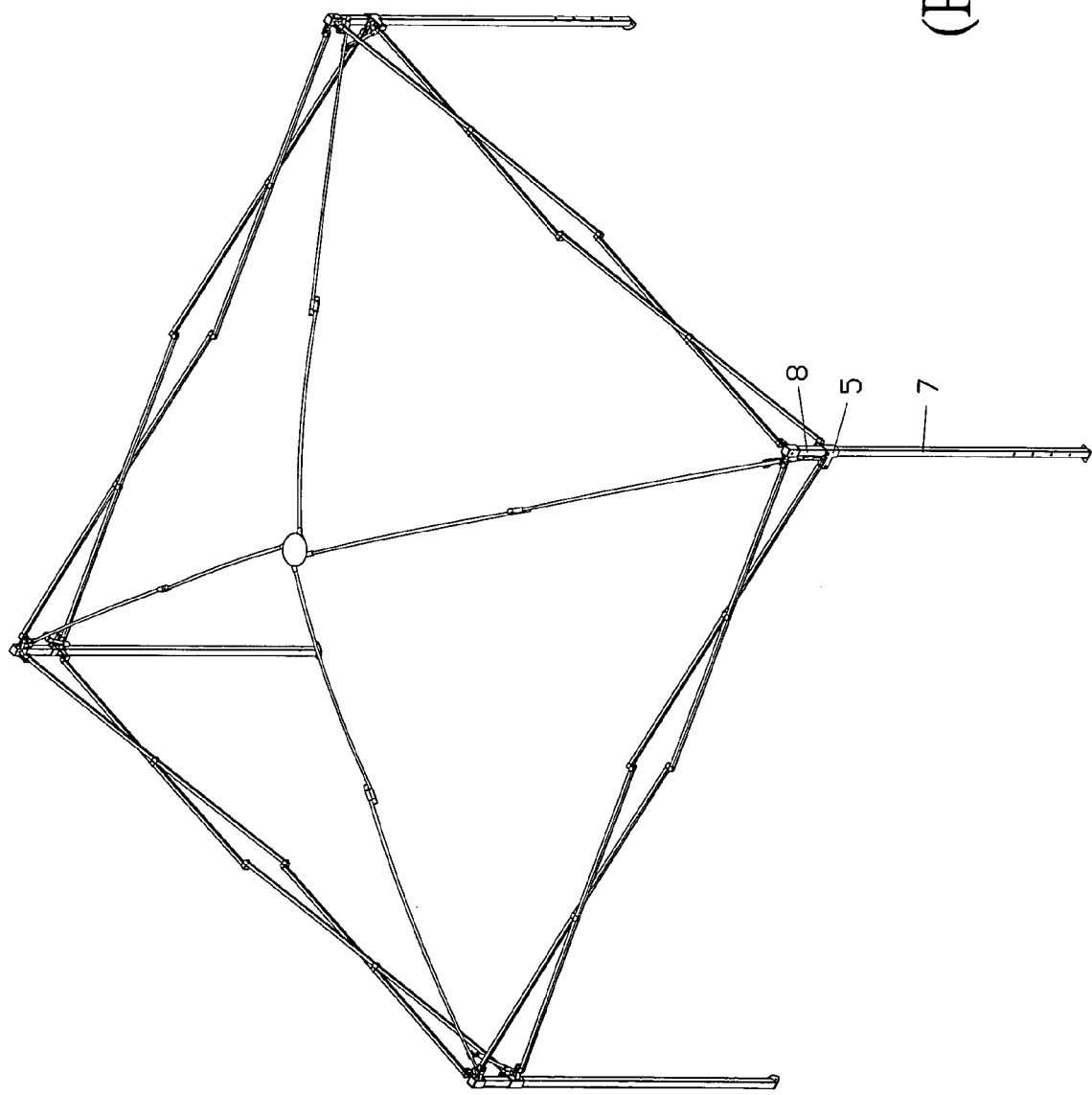
FIG. 7 is a perspective view of a prior tent.
Figure 8:
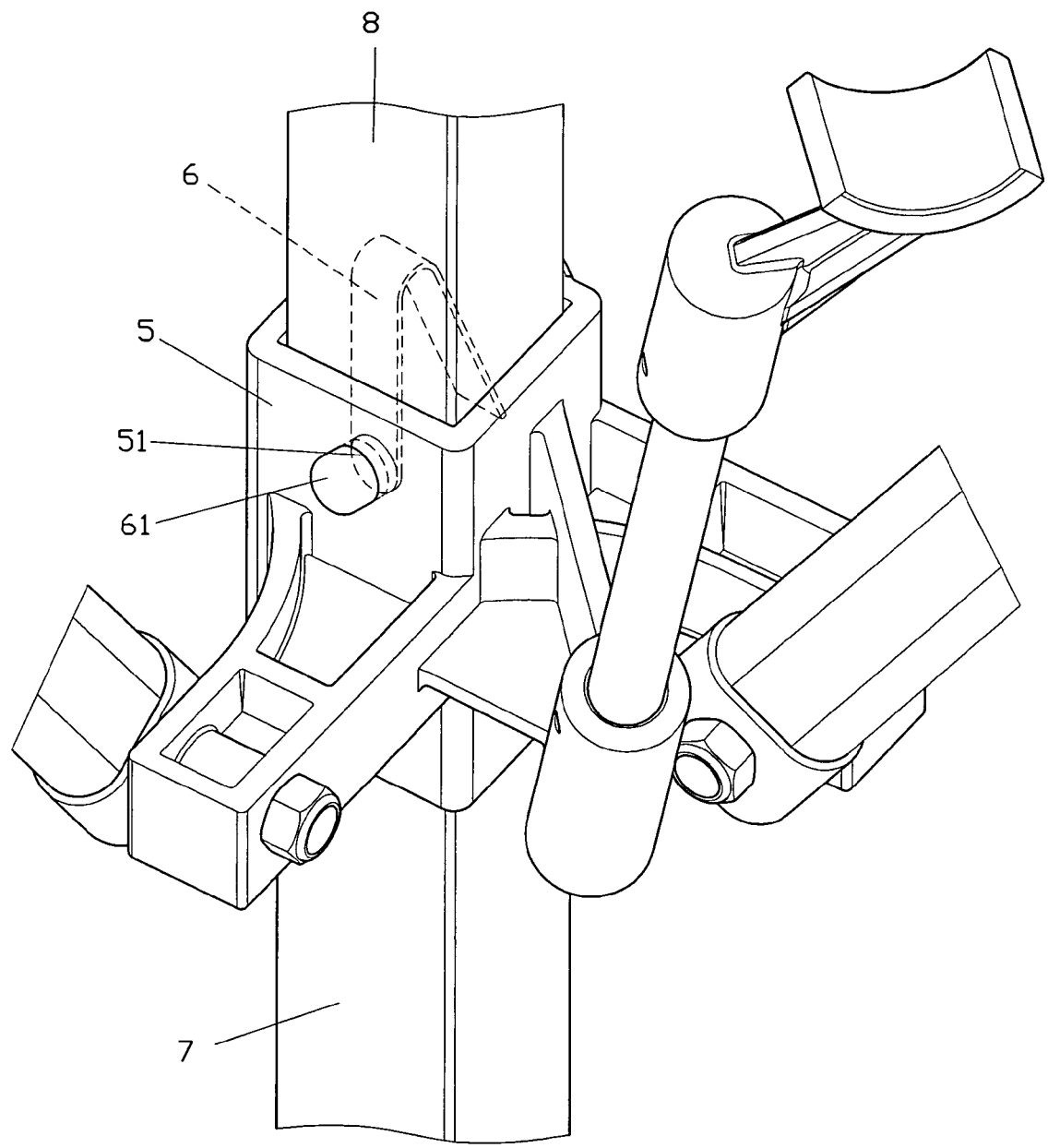
FIG. 8 is an enlarged view of an elastic buckle from FIG. 7.

FIG. 6 shows a closet incorporated with the present invention. By pressing an engaging device 1A secured onto a sliding bracket 2A, an upper strut 4A is able to slide along a lower strut 3A so as to collapse or to expand the closet.

What is claimed is:

1. A locating device for a retractable strut of a tent or a closet comprising an engaging device, a sliding bracket, an upper strut and a lower strut, wherein said upper strut comprises an elastic buckle and is inserted into said lower strut, said sliding bracket being secured onto said lower strut and comprising a though hole corresponding to said elastic buckle of said upper strut, and characterized in that:

said engaging device having a pair of extension plates at respective sides and a stud at an inner center wall thereof, said sliding bracket comprising a pair of slots at respective sides for insertion of said extension plates of said engaging device, each of said extension plates of said engaging device having a pair of elongated openings to form three strips therein, a top strip and a bottom strip of said three strips each being formed with a hook adjacent a distal end thereof, each of said slots of said sliding bracket having a pair of edges respectively at inner top and bottom ends of said slots.

2. The locating device for a retractable strut of a tent or a closet, as recited in claim 1, wherein said sliding bracket comprises a slanting surface at a front top end.

* * * * *